Figure 1:
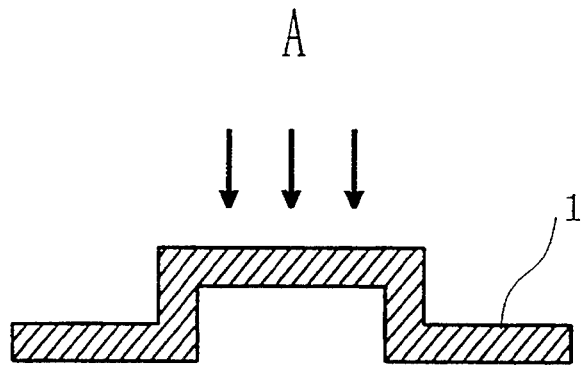

United States Patent [19]

Nakanishi et al.

[11] Patent Number: 5,439,545
[45] Date of Patent: Aug. 8, 1995

[54] PROCESS FOR PRODUCING FINGER-TOUCH KEY FOR MANIPULATION SWITCH

[75] Inventors: Yutaka Nakanishi; Yasushi Sasaki, both of Tokyo, Japan

[73] Assignee: Fuji Polymertech Co. Ltd., Tokyo, Japan

[21] Appl. No.: 79,143

[22] Filed: Jun. 17, 1993

[30] Foreign Application Priority Data

Jun. 19, 1992 [JP] Japan ................... 4-184640
Sep. 16, 1992 [JP] Japan ................... 4-270721

[51] Int. Cl.⁶ ............................................. B32B 31/00
[52] U.S. Cl. ............................. 156/273.3; 156/275.5; 156/275.7; 156/332
[58] Field of Search .............. 156/273.3, 272.2, 326, 156/325, 275.5, 275.7, 272.6, 332

[56] References Cited

U.S. PATENT DOCUMENTS

| | | |
|---|---|---|
| 2,601,337 | 6/1952 | Smith-Johannsen ............ 156/326 |
| 3,056,735 | 10/1962 | Smith-Johannsen ............ 156/272.2 |
| 3,179,546 | 4/1965 | Fischer .............................. 156/272.2 |
| 4,312,693 | 1/1982 | Salensky et al. .................. 156/272.2 |
| 4,401,500 | 8/1983 | Hamada et al. ................... 156/326 |
| 4,431,472 | 2/1984 | Höhl et al. ........................ 156/326 |
| 4,499,148 | 2/1985 | Goodale et al. ................... 156/272.6 |
| 4,618,389 | 10/1986 | Agodoa .............................. 156/326 |
| 4,681,636 | 7/1987 | Saito et al. ........................ 156/326 |
| 4,717,605 | 1/1988 | Urban et al. ...................... 156/275.7 |
| 4,861,408 | 8/1989 | Kelber ............................... 156/273.3 |
| 4,933,234 | 6/1990 | Kobe et al. ........................ 156/273.3 |
| 4,938,827 | 7/1990 | Leach et al. ....................... 156/272.6 |
| 5,002,831 | 3/1991 | Plueddemann ..................... 156/326 |

OTHER PUBLICATIONS

Chemical Abstracts 111(18): 155299p; Wasserman et al., "Transmission and Mechanical Properties of Optical Adhesives," 1988.

Chemical Abstracts 109(8): 56274d; Mitsubishi, "Adhesion of Organic Polymers with Cyanoacrylate Adhesive," 1988.

Primary Examiner—Chester T. Barry
Attorney, Agent, or Firm—McGlew and Tuttle

[57] ABSTRACT

A process for producing a composite finger-touch key with superior fastness, in which the key top layer is chemically bonded to the key base piece even when a silicone resin is employed for the key base piece, which process is characterized by treating the surface of the key base piece to be bonded with the key top layer by exposing to a UV-irradiation or to a plasma discharge in order to subject the surface to a chemical activation, applying then a coupling agent based on silane, such as aminopropyl triethoxysilane, vinyl triethoxysilane and mercaptopropyl trimethoxysilane, to the so-treated surface of the key base piece, providing thereon with a layer of a resin curable by UV-irradiation or by heating, such as those based on, for example, acrylic, epoxy or silicone resin, of an adequate configuration and exposing the resin layer to a UV-irradiation or a heating to cause curing of the resin layer.

11 Claims, 2 Drawing Sheets

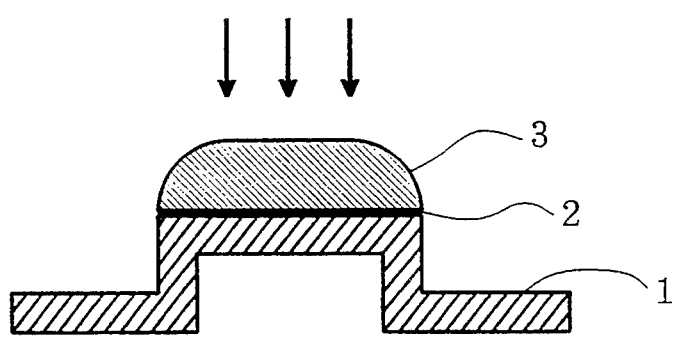

PROCESS FOR PRODUCING FINGER-TOUCH KEY FOR MANIPULATION SWITCH

FIELD OF THE INVENTION

Background of the Invention

The present invention relates to a process for producing a finger-touch key for a manipulation switch, in particular, in the form of a contactor rubber piece for, such as key boards of electronic devices, of a type in which the key top is made of a resin different from that of the key base; and to a contactor rubber piece fitted with such key top.

In the conventional practice, finger-touch keys or contactor rubber pieces are produced by fixing a molded key top piece, which is made of, usually, a transparent resin, such as an acrylic resin or ABS, using an adhesive, onto a separately molded key base piece, which is made of, for example, a silicone rubber for providing for a suitable solid but resilient finger touch feel of the key and is provided thereon with an adequate indication mark by, for example, printing. Here, it is unavoidable to realize the adhesion of the key top piece onto the key base piece by a physical means, since a chemical adhesion of the silicone resin of the key base piece with the art-different resin of the key top piece is difficult. Thus, the conventional practice of producing the finger-touch keys has been suffering from a laborious and time-consuming work of piece-by-piece fixation of the key top piece onto the key base piece by a physical means. While a chemical bonding of the key top piece with the key base piece may be possible by employing a suitable resin material other than silicone resin for the key base piece, it becomes difficult to attain the verified solid but resilient finger touch feel of the key.

SUMMARY OF THE INVENTION

Thus, according to the present invention, it is contemplated to provide a novel process for producing a composite finger-touch key in which the key top layer is chemically bonded to the key base piece even when a silicone resin is employed for the key base piece, by using a resin material curable by UV-irradiation or by heating for the key top layer.

BRIEF DESCRIPTION OF THE INVENTION

FIG. 1 is a vertical section of a key base piece of a contactor rubber piece.

FIG. 2 is a vertical section of a finished composite contactor rubber piece according to the present invention.

DETAILED DESCRIPTION OF THE INVENTION

The above object is achieved according to the present invention by a process for producing a composite finger-touch key for a manipulation switch of a type in which the key top is made of a resin different from that of the key base piece, which process is characterized by treating the surface of the key base piece to be bonded with the key top layer by exposing to one or more short wave length UV-rays or to a plasma discharge in order to subject the surface to a chemical activation, applying then a coupling agent based on silane, such as aminopropyl triethoxysilane, vinyl triethoxysilane and mercaptopropyl trimethoxysilane, to the so-treated surface of the key base piece, providing thereon with a layer of a resin curable by UV-irradiation or by heating, such as those based on, for example, acrylic, epoxy or silicone resin, of an adequate configuration and exposing the resin layer to a UV-irradiation or a heating to cause curing of the resin layer.

The chemical activation treatment of the key base piece surface by exposing it to one or more short wave length ultraviolet rays according to the present invention can be realized under the atmospheric condition using, preferably, UV lamp of 150 nm to 270 nm, of higher output at a distance from the lamps of several cm for several minutes.

The chemical activation treatment of the key base piece surface by exposing it to a plasma discharge according to the present invention can be realized under the atmospheric condition using, for example, carbon electrodes at high output for several seconds.

The chemical activation according to the present invention is believed to form a hydroxyl groups over the surface of the key base piece by breaking the Si-O bonds of the silicone resin by the UV-irradiation and chemical binding of the resulting free radicals with ozone molecules formed by the UV-irradiation of oxygen and with water molecules present within the irradiation atmosphere. These hydroxyl groups will react with the subsequently applied silane coupling agent to form a group reactive with the UV-curable resin of the key top layer coated thereon to build up a chemical bond, whereby the bonding of the key top layer with the key base piece is improved and the fastness of the key is markedly increased.

The UV-irradiation may preferably be realized using two short wave length ultraviolet rays of which one serves for effecting the breaking of Si-O bonds of the silicone resin of the key base piece appearing on the surface thereof and, thus, has a wave length of about 250 nm and the other one serves for activating oxygen and building up ozone molecule and, thus, has a wave length of about 185 nm.

The hardening of the resin of the key top layer is realized by irradiation thereof with an ultraviolet ray of a wave length of, preferably, about 365 nm, when a UV-curable resin is employed therefor, or by heating thereof, when a heat curable (thermosetting) resin is employed therefor. In this manner, the so-cured key top resin layer is firmly fixed to the key base piece by chemical bonds. Thus, according to the present invention, the production of the finger-touch key can be realized by a simple and easy work within a very reduced processing period with simultaneous attainment of a quite improved fastness of the so-produced finger-touch key.

Below, the present invention will be described in more detail by way of Examples with reference to the appended Drawings.

EXAMPLE 1

Using a key base piece of a silicone resin of a contactor rubber piece as shown in FIG. 1 by numeral 1, the top surface thereof was exposed to a UV-irradiation A. For this, a combination of two ultraviolet rays of a wave length of about 185 nm for serving for ozone formation and of a wave length of about 250 nm for serving for breaking the Si-O bonds of the silicone resin was employed. The exposure was effected at an irradiation distance of 20 mm from the UV-lamps for 10 minutes. Directly thereafter, a coupling agent 2 consisting of aminopropyl trimethoxysilane, which is liquid at ordinary temperature, was applied over the UV-treated surface in a thin layer using a glass rod and the coated layer was stood still are left for about 1 minute to dry it. To the so-treated surface, a green pasty mass of uncured resin of an urethane acrylate of "Three Bond 3003" of the firm Three Bond K.K. was applied in a form of swollen lens 3, which was then exposed to a UV-irradiation B with an ultraviolet ray of a wave length of about 365 nm from a UV-lamp for 10 min. to effect curing of the resin.

EXAMPLE 2

The procedures of Example 1 were repeated except that the surface treatment of the key base piece was effected by a corona discharge. The corona discharge treatment was carried out using Tantec Corona Generator HV05-2 with carbon electrodes under the atmospheric condition for 10 seconds.

EXAMPLE 3

A contactor rubber piece was produced by molding the key base piece thereof from a silicone resin, exposing the top face of the molded key base piece to a UV-irradiation with a combination of UV rays (185–250 nm) in a similar manner as in Example 1, coating the so-treated surface within 10 minutes thereafter with a layer of a thermosetting epoxy resin (ADEKAOPTON KT-960 of the firm Asahi Denka Kogyo K.K.) as an adhesive, placing thereon a preliminarily prepared key top piece made from a polycarbonate resin and heating the composite key body to effect curing of the epoxy resin adhesive layer.

EXAMPLE 4

A contactor rubber piece was produced by molding the key base piece thereof from a silicone resin, exposing the top face of the molded key base piece to a UV-irradiation with a combination of UV rays (185–250 nm) in a similar manner as in Example 1, coating the so-treated surface within 10 minutes thereafter with a layer of a UV-curing epoxy acrylate resin (XNR 5490 of the firm Ciba Geigy) as an adhesive, placing thereon a preliminarily prepared key top piece made from a polycarbonate resin and exposing the composite key body to a UV-irradiation to effect curing of the epoxy resin adhesive layer.

We claim:

1. A process for producing a finger touch key for a manipulation switch, comprising
   treating a surface of a key base piece made of a silicone rubber to be bonded with a key top layer made of a resin different from that of the key base piece by exposing it to one or more short wave length UV-rays in order to subject the surface to a chemical activation,
   applying then a coupling agent based on silane to the so-treated surface of the key base piece,
   providing thereon with a layer of a resin curable by UV-irradiation or by heating of an adequate configuration and
   exposing said resin layer to a UV-irradiation or a heating to cause curing of said resin layer.
2. A process in accordance with claim 1, wherein: said resin is a UV-curable or heat curable epoxy acrylate resin.
3. A process for producing a finger touch key, the process comprising:
   molding silicone rubber into a key base piece;
   exposing a surface of said key base piece to short wavelength UV-rays to chemically activate said surface;
   applying a silane based coupling agent to said chemically activated surface;
   applying an uncured layer of resin curable by UV-irradiation or by heat to said coupling agent;
   curing said layer of resin on said key base piece.
4. A process in accordance with claim 3, wherein: said layer of resin is curable to said coupling agent by UV-radiation;
   said layer of resin is exposed to UV-radiation to cause curing of said layer of resin on said key base piece.
5. A process in accordance with claim 3, wherein: said layer of resin is curable by heat to said coupling agent;
   said layer of resin is exposed to heat to cause curing of said layer of resin on said key base piece.
6. A process in accordance with claim 3, wherein: said exposing of said surface to said short wavelength UV-rays is performed using short wavelength UV-rays having a wavelength of approximately 250 nm.
7. A process in accordance with claim 3, wherein: said exposing of said surface to said short wavelength UV-rays is performed using short wavelength UV-rays having a wavelength of approximately 185 nm.
8. A process in accordance with claim 3, wherein: said exposing said surface of said key base piece to short wavelength UV-rays causes breaking of Si-O bonds of said silicone rubber, and chemical binding of resulting free radicals with ozone molecules formed by said short wavelength UV-rays to form hydroxyl groups.
9. A process in accordance with claim 8, wherein: said silane based coupling agent reacts with said hydroxyl groups to form a group reactive with said layer of resin.
10. A process in accordance with claim 3, wherein: said exposing of said surface to said short wavelength UV-rays is performed using short wavelength UV-rays having a wavelength of both approximately 250 nm and 185 nm;
    said exposing said surface of said key base piece to short wavelength UV-rays causes breaking of Si-O bonds of said silicone rubber and chemical binding of resulting free radicals with ozone molecules formed by said short wavelength UV-rays to form hydroxyl groups;
    said silane based coupling agent reacting with said hydroxyl groups to form a group reactive with said layer of resin.
11. A process in accordance with claim 3, wherein: said layer of resin is of a different material than said key base piece.

* * * * *